2 Sheets—Sheet 1.
W. ODHNER.
Calculating-Machine.
No. 209,416. Patented Oct. 29, 1878.
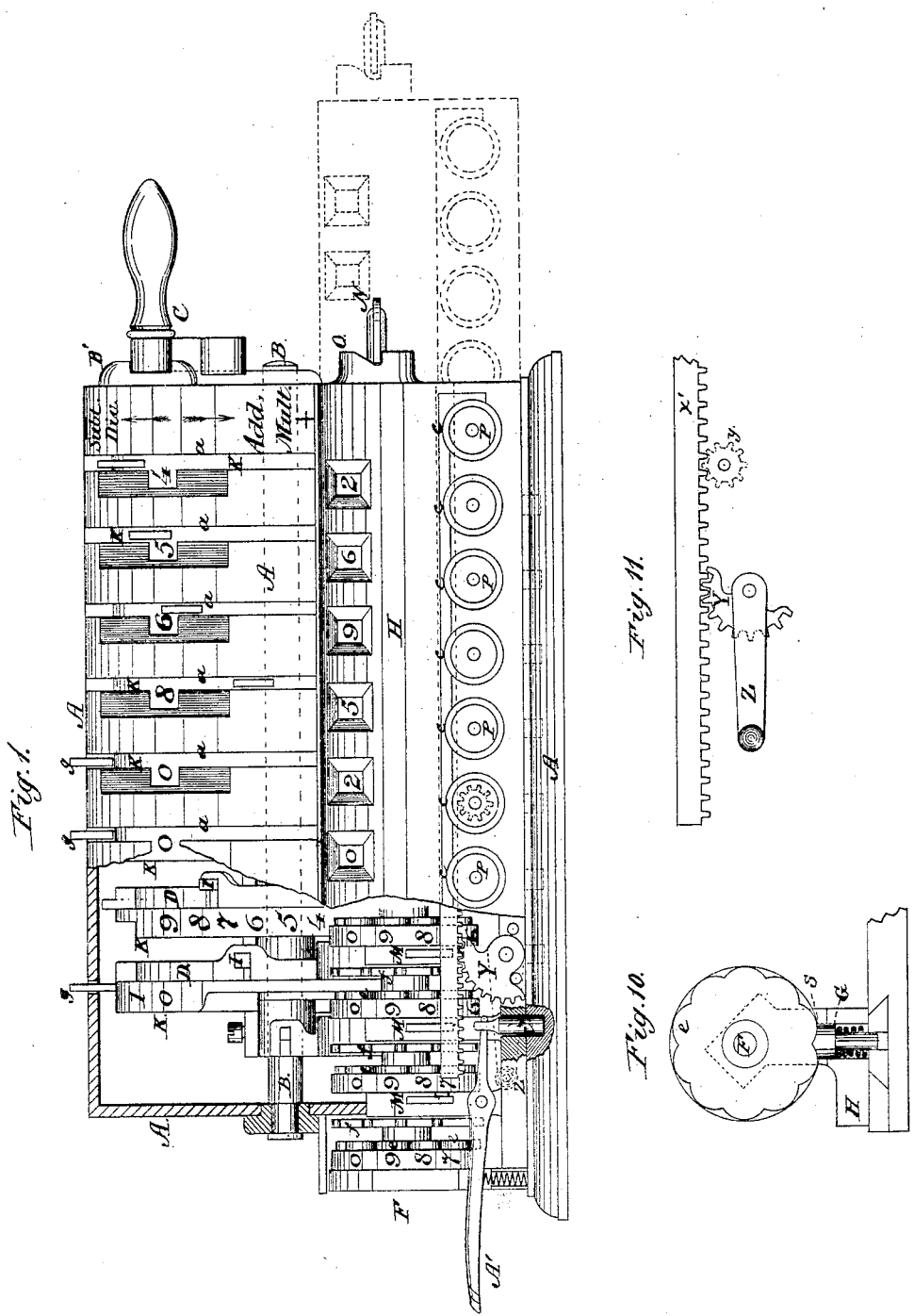
WITNESSES:
W. W. Hollingsworth
Solon C. Kemon
INVENTOR:
W. Odhner
BY
ATTORNEYS.

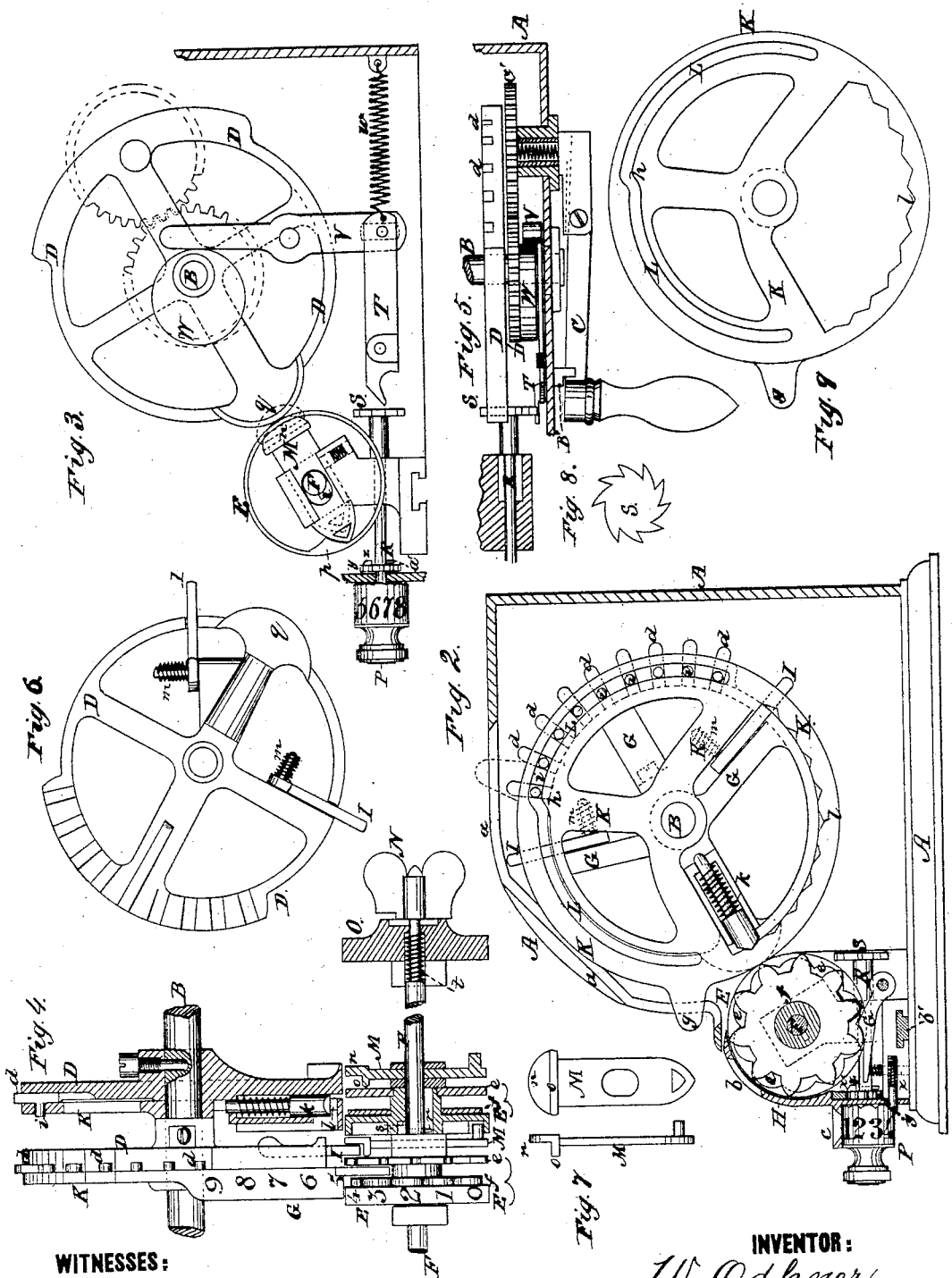

UNITED STATES PATENT OFFICE.

WILLGODT ODHNER, OF ST. PETERSBURG, RUSSIA, ASSIGNOR TO KONIGSBERGER & CO., OF SAME PLACE.

IMPROVEMENT IN CALCULATING-MACHINES.

Specification forming part of Letters Patent No. 209,416, dated October 29, 1878; application filed July 13, 1878.

*To all whom it may concern:*

Be it known that I, WILLGODT ODHNER, of St. Petersburg, Russia, have invented a new and Improved Arithmometer; and I do hereby declare that the following is a full, clear, and exact description of the same.

My invention is an instrument for assisting in calculating, it being adapted to add, subtract, multiply, and divide numbers without any other labor on the part of the operator than that required to set and rotate certain numbered and counting wheels, and to adjust a slide carrying a series of recording-wheels.

The details of construction, arrangement, and operation of parts will be understood from the description hereinafter following, and upon reference to accompanying drawing, in which—

Figure 1 is a front elevation of the machine, with part of the case broken away to show the interior mechanism. Fig. 2 is a cross-section of the machine. Figs. 3 to 11, inclusive, are detail views, which will be hereinafter referred to.

Most of the movable parts of the machine are inclosed and protected by a case, A, which has an inclined or rounded side to facilitate reading the numbers on the different wheels as they appear through the upper row, $a$, middle row, $b$, or lower, $c$, of apertures. The shaft B has its bearings in the ends of case A, and is rotated by crank C, and to it are fixedly attached a series of wheels, D, one-third of the periphery of each of which is constructed with radial recesses or sockets, to receive nine (9) teeth, $d$, one or more of which may be caused to project so as to mesh with the teeth of the smaller toothed wheels $e$, that are rigidly connected with the recording-wheel E, placed on the shaft F, which traverses the box or slide H, made separate from the body of the case A.

The wheels D may be termed the "counting-wheels," and always partake of the rotation of the shaft B. Hence, if the first one of the teeth $d$ of such a wheel be caused to project or stand out from its periphery, and the shaft B be rotated once, said tooth will engage one of the ten teeth of the opposite wheel $e$, mounted loose on a shaft, F, and turn the wheel $e$ through the space occupied by its tooth. Each recording-wheel is composed of three parts, which rotate together: one, $e$, a toothed wheel, with which the teeth of the counting-wheels D engage; another, the toothed or scalloped-edged locking-disk $f$, which is slightly separated from the part $e$; and the third part, E, the recording-wheel proper, whose broad periphery has the cipher (0) and the nine digits arranged in regular numerical order, the cipher being placed between the 1 and 9, the same as on the counting-wheels D. The composite or three-part recording-wheel E $ef$ is held fixed in any adjustment by an automatic friction device consisting of a spring-lever, G, which presses against the periphery of the disk $f$, as shown in Fig. 2. The form of this holding or locking device may be varied, and another form is shown in Fig. 11. The stress of the spring will overcome the inertia of the composite recording-wheel, but is not sufficient to prevent the easy operation of it by the counting-wheels D.

The effect of turning the recording-wheel E the distance of one tooth is to cause the number 1 to appear in the opposite lower aperture, $c$. If, now, instead of one tooth, two (or more) of the teeth $d$ of a counting-wheel, D, be caused to project from its periphery, the recording-wheel E will be moved correspondingly—that is to say, a distance of two or more teeth—and the corresponding number 2 (or a higher number) will appear in the aperture $c$.

It will thus be apparent that the mechanical function of the several counting-wheels D is to rotate the recording-wheels E, which are placed with their peripheries opposite, and that the wheels E will be rotated a peripheral distance corresponding to the number of teeth $d$ that may project from the counting-wheels D. The first counting and recording wheels on the right are for units, the next for tens, the third hundreds, the fourth thousands, and so on. Between each two of the counting-wheels D is a pivoted movable tooth, I, for effecting the operation of "carrying ten," as will be hereinafter described.

The means for moving the nine teeth $d$ of the several counting-wheels D, and thus causing them to project or to recede, as may be required, consist of setting-wheels K, one of which is placed close alongside each counting-wheel D, but is not, like the latter, fast on the shaft B. There are a series of pairs of counting and setting wheels. Each setting-wheel K has the cipher (0) and the nine digits inscribed on its periphery, the linear distance occupied being one-third of the circumference of the wheel. Each setting-wheel K has also a lug or thumb-piece, $g$, by which it is turned on the shaft B and set at the required place. The rim of the several setting-wheels K has a transverse slot, L, which extends about two-thirds around the wheel. This slot is composed of two parts or slots of equal length, which are concentric with the axis B, but describe arcs having radii of different length. Hence, at the point where the two parts of the slot join there is an angular projection, constituting a cam, $h$.

The several teeth $d$ of the counting-wheels D have lateral nibs $i$, Fig. 4, which enter the slot L, and hence, when a setting-wheel, K, is adjusted peripherally, that counting-wheel D which is paired with it being meanwhile held fixed, the angular projection or cam $h$ will so act on the nibs $i$ of the teeth $d$ as to cause the latter to project or retract. If the setting-wheel K be moved through one-third of a revolution in one direction, then all the teeth $d$ will project, because their nibs $i$ will have all passed into that part of the slot L having the greater radius. If in the other direction, then all the teeth $d$ will be retracted, because their nibs $i$ will pass into that part of the slot L having the less radius. Correspondingly, a less movement or adjustment of a setting-wheel, K, will cause the projection or retraction of a less number of teeth $d$. The figures on the periphery of the setting-wheels K appear successively through the upper apertures $a$ in the case A, and serve to indicate the number of teeth $d$ that project from the counting-wheels D. Thus, when all the teeth $d$ are retracted the cipher (0) will appear on the setting-wheels K in all the apertures $a$; but when all are projected the highest number, 9, inscribed on the setting-wheels will appear in the slots $a$. The wheels K are accordingly said to be set on zero or on 9. If a setting-wheel, K, be adjusted so that the figure 2 appears in the aperture $a$, it is an indication that two teeth $d$ have been made to project from the adjoining counting-wheel D. If figure 4 appears, then four teeth $d$ project; if 7, then seven teeth $d$ project, and so on.

It will be apparent, therefore, that if we wish to move a recording-wheel, E, to cause any particular number—say, 2—to appear in a middle aperture, $b$, then the setting-wheel K opposite said recording-wheel must be rotated till that number (2) appears in the upper aperture, $a$. Then, by rotating the shaft B, the series of counting and setting wheels D K will be carried round, and the two teeth $d$ that have just been set, and hence project from the counting-wheel D, will engage the same number (two) of the teeth of the part $e$ of the opposite recording-wheel, and rotate it a corresponding distance, (two-tenths,) so that the desired number (2) will appear in the middle aperture $b$. If, now, we desire to double that number, (2,) we have but to rotate the shaft B again, and the recording-wheel E will be moved the same distance farther, and the number (4) expressing the addition will appear in the aperture $b$. Thus any number of additions can be made, and to any amount.

To subtract, it is obviously only necessary to reverse the rotation of the shaft B, and thereby cause the projecting teeth $d$ of the counting-wheel D to rotate the recording-wheels E backward. Multiplication being but a form of addition, the operation is substantially the same; but a particular manipulation is necessary, as will be presently explained, where the multiplier is above a unit in value. That manipulation consists in adjusting all the recording-wheels E one decimal place to the right for hundreds, two for thousands, and so on, the recording-wheels E being attached to slide H for that purpose.

I will now describe the devices for holding the setting-wheels K in any adjustment, and for carrying the tenths.

The holding device $k$ is a spring-stop, which is placed in a radial position in a socket formed on the left side of each counting-wheel D, diametrically opposite the middle one of the nine teeth $d$.

The adjacent portion of the inner periphery of the next setting-wheel K is provided with ten notches, $l$, and the stop $k$ works in frictional contact with such notched section of the wheel. When a setting-wheel K is adjusted peripherally, the stop $k$ moves over a corresponding number of notches $l$. If one or two or nine teeth $d$ be caused to project from a counting-wheel D, then the stop $k$ will enter the first or second or ninth notch of the setting-wheel correspondingly. Thus each setting-wheel K is locked in the desired adjustment with relation to a counting-wheel D, so that the pairs of such wheels appear and act when rotating as one double wheel.

The tenths are carried by the long pivoted teeth I, there being two for each pair of counting and setting-wheels D K, except the units-wheel. These teeth I are pivoted to arms of the counting-wheels D, one at each end of the peripheral row of adjustable teeth $d$ before described. A spring, $m$, is so connected with each of the teeth I that the latter are pressed laterally to the right in the open notches formed in the periphery of the wheel D, Figs. 1 and 6. Each tooth I projects from the periphery of the wheels D, and its outer end is thrown laterally (to the left) at the proper time to cause it to move the next recording-wheel E on the left—that is to say, that wheel which is next to or on the left of the recording-wheel K, which is opposite the counting-wheel D, with which the tenth-carrying tooth I is connected and with which it rotates. The lateral movement is effected by a slide, M, Figs. 3, 4, 7, having a semicircular head, $n$, and a lateral semicircular projection or rib, $o$. The slide M is held in a suitable guide-frame and slotted to receive the shaft F, on which the recording-wheels E are mounted, and is also set inclined, Fig. 3, with the head $n$ pointing to the shaft B of the counting and setting wheels. The lower ends of the slides M are beveled to an angle, and in each complete revolution of the adjacent recording-wheels they come in contact with an angular projection or cam, $p$, Fig. 3, formed on the inner periphery of the inscribed recording-wheels. The consequence of this construction and arrangement of parts is that, when the shaft B is rotated and the number of figures to be added or multiplied exceeds nine units, the cam $p$ will come in contact with the beveled end of the slide M connected with the units-recording wheel, and push up the slide so that it will project toward shaft B, as shown in dotted lines in Fig. 3. Then the tenth-carrying tooth I of the units-counting wheel will strike the lateral rib $o$ on the head of the slide M and pass around it to the left, in doing which it will enter a notch, or, what is the same thing, engage a tooth of part $e$ of the next recording-wheel on the left, and thus move such wheel the distance of one notch or tooth, thereby carrying ten. The function of the slotted slide M is then performed, and it becomes necessary to force it back to its original position until again required for the operation of carrying tenths. This is effected by a cam or boss, $q$, Fig. 3, on the opposite counting-wheel D, as will be readily understood on reference to Fig. 3.

It is obvious that the operation is the same for carrying one between the tens and hundreds, and hundreds and thousands, and thousands and tens of thousands recording wheels as between the units and tens wheels, and hence need not be described.

The slotted slides M are held in the projected or retracted position by a small friction spring-stop, as in Fig. 3.

When the recording-wheels E have been moved or rotated from the zero position, and a new addition or other numerical operation is to be begun, it is necessary to carry them back to zero—that is to say, back to such position that the zeros or ciphers on their peripheries will appear through the apertures $b$. To do this I arrange the shaft F so that it is capable of rotation by a thumb-piece, N, fixed on its outer end. The shaft is provided with a series of radial fingers or lugs, $r$, Fig. 4, which will engage corresponding fingers or lugs $s$ projecting inwardly from the hollow hubs of the recording-wheels E. The shaft F is pressed toward the left by a spiral spring, $t$, and is drawn toward the right, so as to bring its lugs $r$ in engagement with the lugs $s$ of the recording-wheels E by a fixed cam or notched annular boss, O, on the end of the case A, with which the thumb-piece N works in frictional contact. When the edge of the thumb-piece N enters the notch in the boss O, it allows the shaft F to be pushed endwise to the left by spring $t$, and the recording-wheels E are then free to rotate; but if the latter are not on zero, then the rotation of the thumb-piece N will draw the respective lugs $r$ $s$ into engagement and cause the recording-wheels E to turn back to zero.

I employ a series of small cylinders or cylindrical buttons, P, to indicate, for addition, subtraction, and multiplication, the number of revolutions up to nine each made by the counting and setting wheels D K, and also for indicating the quotient in division. These cylinders P are inscribed with the cipher and nine digits, and one cylinder is arranged for a pair of units, tens, hundreds, &c., counting and setting wheels, and each is fixed on a small shaft, R, that is arranged in a horizontal plane at right angles to the axis $A'$ of the last-named wheels. A ratchet, S, is fixed on the inner end of each cylinder-shaft R, and with this a reciprocating bevel-nosed push-pawl, T, Figs. 3, 5, engages at each rotation of the shaft B. Said pawl slides in a suitable guide, is retracted by a spring, $w$, and pushed forward by a pivoted lever, V, whose upper end works in contact with an eccentric, W, Figs. 3, 5, fixed on the shaft B. Each time the shaft B rotates, and thus carries around the eccentric W, the pawl T advances and moves the ratchet S one notch, thereby intermittently rotating the cylinder P, fixed on the other end of the shaft R. The ratchet S is, however, so constructed—one tooth being removed or absent from the regular series—that when the ratchet has been moved nine-tenths of a complete rotation the pawl T has no more effect on it. This construction and operation have a certain relation to the number of teeth in the counting-wheels D and the recording-wheels E, both of which only count up to nine. The means for locking the cylinders P in any position or adjustment are friction spring-stops $x$, Fig. 2, substantially like those employed in connection with the counting-wheels and recording-wheels, and previously described.

The cylinders P are provided with milled heads or knobs, to enable them to be individually rotated back to zero when desired; but one or all may be rotated back by means of a sliding rack-bar, $x'$, operated by loose pinions $y$ on the shaft R, a toothed segment-lever, Y, and a handle or small crank, Z, Figs. 1 and 11, which is fixed on the same shaft as the segment-lever Y, but on the outside of the case A. The rack-bar $x'$ is constantly in mesh with the pinions $y$; but the latter have a tooth, $z$, Figs. 2 and 3, which, at one point in their rotation, come in contact with teeth $a'$ on the shaft R, and thus turn the latter so as to bring the cylinders P back to zero.

When, however, the cylinders P are set on zero, the teeth or lugs $z$ $a'$ do not engage, and the movement of the rack-bar $x'$ has no effect. Hence, if a part of the cylinders P are not on zero, they may be rotated back by moving the crank Z to the right without changing the position of those cylinders which are already on zero.

As before intimated, the several recording-wheels E *e f* and the devices directly connected therewith, including the shaft F, numbered cylinders P, and rack-bar *x'*, &c., are mounted in a portion, H, of the case A, which is adapted to slide endwise for the purpose of carrying on the process of multiplication when the multiplier is some number having a value above units, also in certain cases of division. Said portion H of the case A slides on a dovetailed rib, *b'*, and it is locked in any adjustment by means of a lever, A', Fig. 1, and spring stop-pin *c'*, which latter enters holes in the base-plate of the case A.

The crank C, for rotating the axis B of the counting and setting wheels, is jointed near its middle and its inner end pressed outward, so that its outer end will retain its place in the catch B' on the end of the case A when left free, Figs. 1 and 5. The crank rotates a gear, C', which meshes with another gear, D', on shaft B, Fig. 5.

To operate the arithmometer, the several inscribed or numbered wheels K and E, and also the cylinders P, are all set on zero, and the crank C placed in the catch B'.

For addition, the first of the numbers to be added is brought down and made visible in the upper apertures *a* of the case A by moving the proper setting-wheels K. The crank C is then rotated once to the left or downward, as indicated by the arrow pointing to "add" on the right-hand end of the case A, Fig. 1, which will move the recording-wheels E and cause them to exhibit the same number in the middle apertures, *b*. The setting-wheels K are then adjusted to show the second number to be added, and the crank C turned as before, which will cause the recording-wheels E to rotate correspondingly, and thus exhibit the sum of the two numbers in the apertures *b*, and so on till all the numbers to be added together have been successively set up or caused to appear in apertures *a*, and merged in the sum to be finally exhibited by the recording-wheels in apertures *b*.

For example, to add 12 and 250, move, by means of its lug *g*, the first units-setting wheel K two spaces, or until the number 2 appears in the first or right-hand aperture of row of apertures *a*. Then adjust the second or tens-setting wheel K one space so that the figure 1 will appear in the second aperture *a*. Then rotate the crank C downward, and the number 12 will appear in the middle row of apertures, *b*. The first, second, and third (units, tens, hundreds) setting-wheels are then adjusted to exhibit 250 in apertures *a*, and the crank rotated once downward. The sum of the two numbers—to wit, 262—will then appear in the middle row of apertures, the first recording-wheel E having been moved two spaces, the next six spaces, and the third two spaces.

For subtraction the process is, of course, reversed. The wheels K E and cylinders P are first set on zero. Then the minuend is set up by adjusting the setting-wheels K, and the crank C is turned as for addition, thus causing the minuend to appear also in the middle row, *b*, of apertures. The subtrahend is then set up in the upper row, *a*, of apertures, and the crank C rotated backward or to the right, as indicated by the upper arrow pointing to "Subt."

For example, to reverse the above process of addition, suppose the number 262 to be exhibited by the recording-wheels E in the middle row, *b*, of apertures, and it is desired to subtract 12 from it. Then set the tens and units recording wheels E to exhibit 12. Then rotate the crank C once backward and bring it to rest in the notched catch B'. Then the remainder, 250, will appear in the middle row of apertures. To subtract other numbers, set them up and rotate the crank C backward each time one is set up, successively.

For multiplication, the process is as follows: Adjust the setting-wheels K so that the multiplicand or number to be multiplied will appear in apertures *a*. Then, if the multiplier be units, rotate the crank downward as many times as there are units in the multiplier, and the product will appear in the middle row, *b*, of apertures. If the multiplier be above units, first rotate the crank C to the left or downward as many times as there are units and adjust the tens-setting wheel K to show the second figure of the multiplier; then adjust the slide H one place to the right to bring the hundreds-recording wheel E opposite the units-setting wheel; rotate the crank C as many times as there are hundreds in the multiplier, and so on, the slide being adjusted to the right each time there is a multiplication by figures of increasing value—by the tens of hundreds, thousands, or tens of thousands, &c.

Thus, to multiply 8,654 by 3. Set up 8,654 in the upper row, *a*, of apertures, as shown in Fig. 1. Then rotate the crank three times downward, and the product, 25,962, will appear in the middle row of apertures, (8,654×3= 25,962.) Suppose this amount, 8,654, was to be multiplied by 33 instead of 3. Then, having multiplied by the 3 units and obtained the product, 25,962, as just described, move the slide H one place to the right (for the 3 hundreds) and rotate the crank again three times, and the desired result will appear in its place, (8,654×33=285,582.)

For division, the operation consists in setting up the dividend in upper row, *a*, of apertures, then rotating the crank C forward or to left to cause the same number to appear in the middle row of apertures, *b*. The divisor is then set up in the same way and the crank rotated backward or to the right until nothing remains in the dividend's place, or else a remainder will remain which is less than the divisor. The quotient will appear on the cylinders P, since they indicate the number of times the crank C has been rotated, and hence the number of times the divisor has been subtracted from the dividend. (The principle that division is merely a mode of subtraction is thus mechanically illustrated.) If the dividend exceed the divisor, or the latter will not evenly divide the former, the slide H must be adjusted to the right as many places as there are to be decimals in the quotient.

To divide 12 by 4, set up 12 in apertures $a$ and turn crank C to left or downward to cause 12 to appear in middle row, $b$, of apertures. Then set up 4 in units place in upper row, $a$, of apertures and turn crank to right or backward till zero appears in the place of the dividend. The quotient 3 will then appear on the first or units cylinder, P, ($12 \div 4 = 3$.)

To reverse the former example of multiplication, suppose the number or former product, 285,582, appears as the dividend in the middle row, $b$, of apertures. Then set up the divisor, 8,654, which was the former multiplicand, and adjust the slide H one place to the right until the first figure (8) of the divisor is directly over the second figure (8) of the dividend, counting from the left. Then turn the crank C backward or to the right until the first figure (8) of the divisor can no longer be subtracted from the figures in the dividend which are under and to the left of it. The number 3, which is the first figure of the quotient, will then appear on the second cylinder, P, and the dividend will be reduced to 25,962. The slide H is next moved one place to the left, or back to its original position, as shown in full lines, Fig. 1, and the crank again rotated until the dividend disappears and a line of zeros stands in its place. The figure 3 will then appear on the first cylinder, P, making the second figure of the quotient sought—to wit, 33. It will be seen that the result indicates that the divisor, 8,654, is contained three times in the first five figures, 28,558, of the dividend, and three times in the new or second dividend, 25,962.

In the matter of carrying out for decimals, suppose the dividend is four cents, to be divided into six equal parts. Set up 4 in units' place in upper aperture, $a$, and move the slide H three (3) places to the right. Then rotate crank C and bring down the 4 in the thousands' place in the middle row, $b$, of apertures. The 4 will then be directly under the 6; but, since 4 is not divisible by 6, the slide H is moved back one place to the left. The crank is then rotated backward so long as the first two figures (40) can be divided by 6, and 6 will appear in the quotient. The slide H is then again adjusted to the left and the operation repeated, and another 6 will appear in the quotient. A third and last adjustment of the slide H is made, and a third 6 will appear in the quotient, with a remainder of 4 in the unit's place of middle row, $b$, of apertures. The decimal point is obviously to be placed before the first figure of the quotient—thus, .666—since the slide was moved three places to the right; or, in other words, because three ciphers were added to the dividend.

I do not claim, broadly, setting the teeth of counting-wheels by means of an adjustable cam or cam-wheel, nor the use of a slide for causing the lateral movement of tenth-carrying teeth, nor the combination of a toothed counting and recording wheel.

What I claim is—

1. In an arithmometer, the series of teeth $d$, having nibs or lateral projections, in combination with the loose setting-wheel having a continuous slot, whose two equal parts are arcs of different radii, and the counting-wheels fixed on the rotating shaft, and the automatic spring-stop attached to one wheel and acting on the other, all constructed and arranged as shown and described, whereby the adjustment of the setting-wheels circumferentially causes the positive movement of the said teeth out or in by the passage of the nibs from one part of the slot into the other, and holds the teeth thus projected or retracted, as specified.

2. In an arithmometer, the combination of the pairs of counting-wheels carrying adjustable teeth, and the setting-wheels, having a toothed section, and an automatic or spring stop for locking the respective wheels together in any adjustment, said stop being attached to a counting-wheel and acting constantly on said toothed section of a setting-wheel, so that when sufficient pressure is applied to the setting-wheel in the direction of its periphery the spring will yield instantly and allow the desired adjustment, as specified.

3. The combination, with a recording-wheel having the cam formed on its inner periphery, and the slides having a fixed angle on the same shaft F, of the recording-wheels, all as shown and described.

4. The toothed part of the recording-wheels and the part having its periphery inscribed with the cipher and nine digits, and the slides all placed side by side on the same shaft F, and the counting-wheels or shaft B, all combined as shown and described, for the purpose specified.

5. In an arithmometer, the combination of the sliding rack-bar, the inscribed cylinders and their shafts, the pinion, mounted loose on the latter, and provided with lugs to engage lugs on the shafts, all as shown and described, whereby the reciprocation of said rack-bar will rotate the cylinders back to zero, but will not move or adjust them when standing on zero, as specified.

6. In an arithmometer, the combination of the spring-lever A' and stop $c'$ with the toothed portion of the recording-wheels and the toothed counting-wheels for rotating said recording-wheels, as shown and described.

7. In an arithmometer, the combination of the spring-stop with the cylinders having teeth formed on their inner ends, and the shafts R, ratchets and push-pawl, as shown and described.

8. In an arithmometer, the combination of the thumb-piece and fixed cam, the shaft or rod F, the recording-wheels, and the lugs on said rod and wheels, as described, whereby the rotation of the shaft will carry all the wheels back to the zero position, as shown and described.

9. In an arithmometer, the combination of the spiral spring $t$, thumb-piece N, fixed cam, and the shaft and recording-wheels, provided with lugs so located that when the thumb-piece is rotated the lugs will not engage when the recording-wheels are standing on zero, as specified.

10. In an arithmometer, the combination of the jointed crank having a spring for throwing its outer end inward, the notched catch fixed on the case A, the gears C' D', the shaft B, and counting and recording wheels, all as shown and described.

WILLGODT ODHNER.

Witnesses:
GEORGE POMUTZ,
WENZESLAUS WADIK.